US012766623B2

(12) United States Patent
Sakai et al.

(10) Patent No.: US 12,766,623 B2
(45) Date of Patent: Oct. 20, 2026

(54) LAMINATE SHAPING METHOD

(71) Applicants: MITSUBISHI HEAVY INDUSTRIES COMPRESSOR CORPORATION, Tokyo (JP); Yamazaki Mazak Corporation, Aichi (JP)

(72) Inventors: Yasunori Sakai, Hiroshima (JP); Daisuke Yamauchi, Hiroshima (JP); Naoya Hayashida, Hiroshima (JP); Kazuhiro Ishibashi, Aichi (JP); Yasuyuki Tanaka, Aichi (JP); Atsushi Suzuki, Aichi (JP); Seigo Ouchi, Aichi (JP)

(73) Assignees: Mitsubishi Heavy Industries Compressor Corporation, Tokyo (JP); Yamazaki Mazak Corporation, Aichi (JP)

( * ) Notice: Subject to any disclaimer, the term of this patent is extended or adjusted under 35 U.S.C. 154(b) by 994 days.

(21) Appl. No.: 17/938,145

(22) Filed: Oct. 5, 2022

(65) Prior Publication Data

US 2023/0110900 A1 Apr. 13, 2023

(30) Foreign Application Priority Data

Oct. 12, 2021 (JP) ................................ 2021-167262

(51) Int. Cl.
*B23K 9/04* (2006.01)
*B23K 31/02* (2006.01)
(Continued)

(52) U.S. Cl.
CPC .............. *B23K 9/042* (2013.01); *B23K 31/02* (2013.01); *B23K 2101/00* (2018.08); *B33Y 10/00* (2014.12)

(58) Field of Classification Search
None
See application file for complete search history.

(56) References Cited

U.S. PATENT DOCUMENTS

2017/0129180 A1* 5/2017 Coates .................. B23K 26/16
2019/0134732 A1* 5/2019 Sakai .................... B33Y 10/00
(Continued)

FOREIGN PATENT DOCUMENTS

EP 3778237 A1 2/2021
EP 3868505 A1 8/2021
(Continued)

*Primary Examiner* — Elizabeth M Kerr
(74) *Attorney, Agent, or Firm* — Osha Bergman Watanabe & Burton LLP

(57) ABSTRACT

A laminate shaping method includes: a unit step repeatedly performed, the unit step including a step of forming a laminate shaped portion by laminating metal layers formed of weld beads, and a step of forming a processed side surface by cutting a shaped portion side surface facing a second direction intersecting a first direction, in which, in the step of forming the processed side surface, the shaped portion side surface is cut so that a receiving portion projecting in the second direction with respect to the processed side surface is formed at an uppermost layer of the laminate shaped portion in the first direction, and when the unit step is repeated, in the step of forming the laminate shaped portion, a new metal layer is laminated so as to overlap an upper surface of the receiving portion in the first direction.

5 Claims, 7 Drawing Sheets

(51) Int. Cl.
*B33Y 10/00* (2015.01)
*B23K 101/00* (2006.01)

(56) References Cited

U.S. PATENT DOCUMENTS

2021/0402507 A1* 12/2021 He .................... B23K 20/1255
2022/0059272 A1* 2/2022 Ramabhadran ........... B22F 7/06
2022/0364471 A1* 11/2022 Schudeleit ................ F01D 5/34

FOREIGN PATENT DOCUMENTS

EP 3954487 A1 2/2022
JP 2019-084553 A 6/2019
JP 2020-185590 A 11/2020

* cited by examiner

LAMINATE SHAPING METHOD

BACKGROUND OF THE INVENTION

Field of the Invention

The present disclosure relates to a laminate shaping method.

Priority is claimed on Japanese Patent Application No. 2021-167262, filed on Oct. 12, 2021, the content of which is incorporated herein by reference.

Description of Related Art

For example, Japanese Unexamined Patent Application, First Publication No. 2019-84553 discloses a configuration in which metal layers formed of weld beads formed by arc welding are sequentially laminated as a laminate shaping method for shaping a three-dimensional shaped object.

CITATION LIST

Patent Document

[Patent Document 1]
Japanese Unexamined Patent Application, First Publication No. 2019-84553

SUMMARY OF THE INVENTION

However, in the configuration as disclosed in Japanese Unexamined Patent Application, First Publication No. 2019-84553, in a case where the thickness of the metal layer that has already been laminated is small, when a new metal layer is laminated by arc welding, an end portion of the metal layer that has already been laminated may melt and sag along with the new metal layer. This is because the metal layer that has already been laminated is melted by the influence of the heat of a welding material that is in a molten state to laminate the new metal layer. Such a phenomenon has a significant influence on the end portion of the metal layer. As a result, in the process of laminating the metal layer, there are cases where the shape of the side surface which is the end portion of the metal layer collapses due to the sagging, and the next metal layer cannot be accurately laminated.

The present disclosure provides a laminate shaping method in which a three-dimensional shaped object can be formed with good quality by suppressing the influence of sagging when metal layers are laminated by welding.

A laminate shaping method according to the present disclosure is a laminate shaping method of shaping a three-dimensional shaped object formed by sequentially laminating a plurality of metal layers, the method including: a unit step repeatedly performed, the unit step including a step of forming a laminate shaped portion by laminating metal layers formed of weld beads, and a step of forming a processed side surface by cutting a shaped portion side surface of the laminate shaped portion that faces a second direction intersecting a first direction in which the metal layers are laminated, in which, in the step of forming the processed side surface, the shaped portion side surface is cut so that a receiving portion projecting in the second direction with respect to the processed side surface, the receiving portion is formed at an uppermost layer of the laminate shaped portion in the first direction, and when the unit step is repeated, in the step of forming the laminate shaped portion, a new metal layer is laminated so as to overlap an upper surface of the receiving portion in the first direction.

According to the laminate shaping method of the present disclosure, it is possible to form a three-dimensional shaped object with good quality by suppressing the influence of sagging when metal layers are laminated by welding.

DETAILED DESCRIPTION OF THE INVENTION

Hereinafter, an embodiment for carrying out a laminate shaping method according to the present disclosure will be described with reference to the accompanying drawings. However, the present disclosure is not limited to this embodiment.

Figure 1:
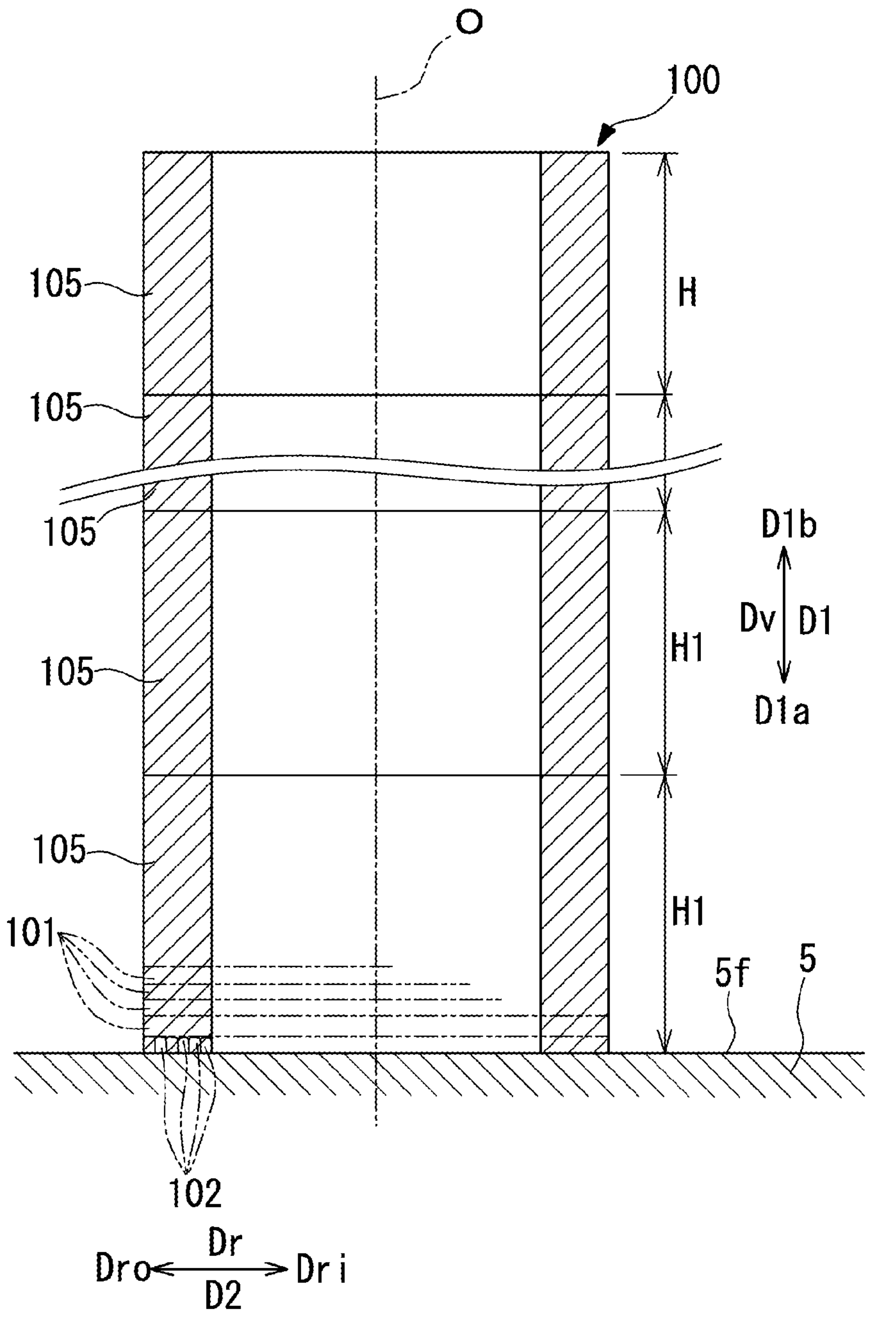
FIG. 1 is a cross-sectional view parallel to an axis showing an example of a shaped object shaped in a laminate shaping method according to the embodiment of the present disclosure.

As shown in FIG. 1, in a laminate shaping method S10 in the embodiment of the present disclosure, a three-dimensional shaped object 100 is shaped. The shaped object 100 shaped in the laminate shaping method S10 of the present embodiment is a component forming a rotating machine such as a turbine or a compressor. More specifically, as the shaped object 100 to be shaped, there are a nozzle, an impeller, and a casing. In the present embodiment, as the shaped object 100, a cylindrical nozzle extending in a first direction D1 centered on an axis O is shaped. A fluid which is a gas such as steam or air can flow through the inside of the nozzle (the shaped object 100) after completion as a working fluid so that the first direction D1 is a flow direction F1 (see FIG. 4).

In the laminate shaping method S10, a plurality of metal layers 101 are laminated on a support surface **5*f* of a table 5, and the shaped object 100 having a predetermined shape is shaped. The laminate shaping method S10 is carried out by a numerical control (NC) processing machine to which a welding torch and a processing tool are attached. One metal layer 101 consists of weld beads 102. The weld beads 102 are generated by arc welding performed by the welding torch of the NC processing machine. The support surface 5***f* of the table 5 forms a surface orthogonal to the first direction D1. In the present embodiment, the first direction D1 is set to coincide with a vertical direction Dv. Accordingly, the plurality of metal layers 101 are laminated on the support surface 5*f* from a first side D1*a* (a side approaching the support surface 5*f* with respect to the metal layer 101) toward a second side D1*b* (a side away from the support surface 5*f* with respect to the metal layer 101) in the first direction D1. That is, the first direction D1 is the direction in which the metal layers 101 are laminated. The first direction D1 may be a direction inclined with respect to the vertical direction Dv as long as the first direction D1 is not orthogonal to the vertical direction Dv.

Figure 2:
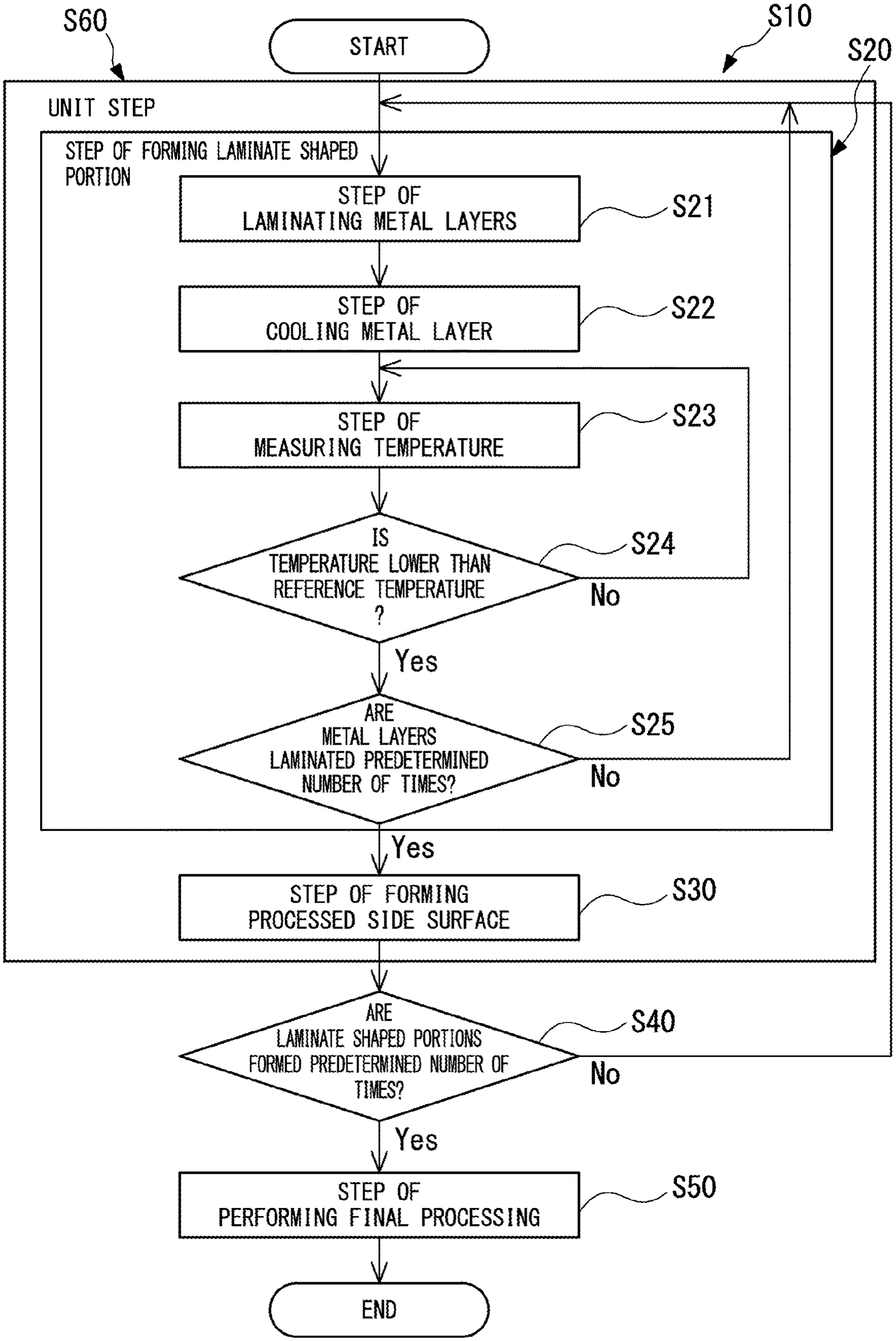
FIG. 2 is a flowchart showing the order of the laminate shaping method.

As shown in FIG. 2, the laminate shaping method S10 of the present embodiment mainly includes a step S20 of forming a laminate shaped portion 105, a step S30 of forming a processed side surface 103, a step S40 of determining the number of times the laminate shaped portion 105 is formed, and a step S50 of performing final processing.

Figure 3:
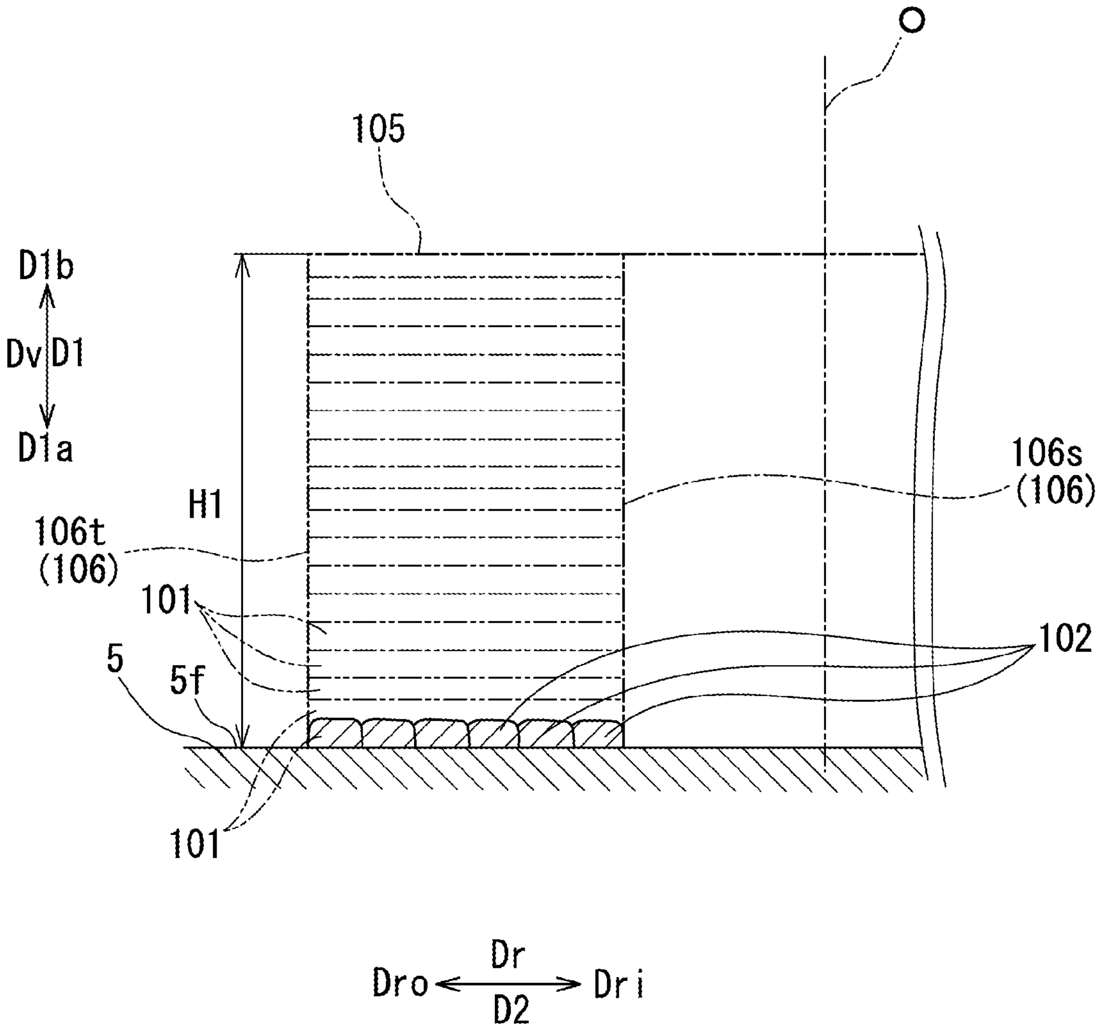
FIG. 3 is a semi-cross-sectional view parallel to the axis showing a state in which a laminate shaped portion having a predetermined height is formed in a step of forming a laminate shaped portion of the laminate shaping method.

As shown in FIG. 3, in the step S20 of forming the laminate shaped portion 105, the laminate shaped portion 105 having a predetermined height H1 in the first direction D1 is formed. The laminate shaped portion 105 constitutes a part of a region of the shaped object 100. As shown in FIG. 2, the step S20 of forming the laminate shaped portion 105 includes a step S21 of laminating the metal layer 101, a step S22 of cooling the metal layer 101, a step S23 of measuring a temperature, a step S24 of determining the temperature, and a step S25 of determining the number of laminated layers. In the step S20 of forming the laminate shaped portion 105, the step S21 of laminating the metal layer 101, the step S22 of cooling the metal layer 101, the step S23 of measuring the temperature, the step S24 of determining the temperature, and the step S25 of determining the number of laminated layers are repeated a preset number of times. In the step S20 of forming the laminate shaped portion 105, a predetermined number of metal layers 101 are laminated in the first direction D1 to form the laminate shaped portion 105 having the predetermined height H1. The laminate shaped portion 105 having the predetermined height H1 has a shaped portion side surface 106 facing a second direction D2 intersecting the first direction D1 in a cross section parallel to the axis O. In the present embodiment, the laminate shaped portion 105 is formed in a cylindrical shape extending in the first direction D1. In addition, the second direction D2 of the present embodiment is a direction orthogonal to the first direction D1 and is a radial direction (width direction) Dr of the laminate shaped portion 105. Therefore, the laminate shaped portion 105 has, as the shaped portion side surface 106, an inner shaped portion side surface 106*s* facing an inside Dri in the radial direction Dr (second direction D2) and an outer shaped portion side surface 106*t* facing an outside Dro in the radial direction Dr. That is, the inner shaped portion side surface 106*s* is the inner circumferential surface of the laminate shaped portion 105 facing the axis O in the radial direction Dr. In addition, the outer shaped portion side surface 106*t* is the outer circumferential surface of the laminate shaped portion 105 facing the side opposite to the axis O in the radial direction Dr.

As shown in FIG. 3, in the step S21 of laminating the metal layers 101, the metal layers 101 formed of the weld beads 102 formed by arc welding are laminated. In the step S21 of laminating the metal layers 101, first, the weld beads 102 are formed on the support surface 5*f* of the table 5 by arc welding. In the step S21 of laminating the metal layers 101, the weld beads 102 are formed based on shape data of the shaped object 100 input in advance. In the step S21 of laminating the metal layers 101 of the present embodiment, a plurality of passes of weld beads 102 are continuously formed by arc welding in the second direction D2 orthogonal to the first direction D1 to constitute one metal layer 101. In the step S21 of laminating the metal layers 101, it is preferable to form the weld beads 102 by high-speed welding such as rotary arc welding.

The metal layer 101 is not limited to the plurality of passes of weld beads 102 constituting one layer as in the present embodiment, for example, and only one pass of the weld bead 102 may constitute one layer.

In the step S22 of cooling the metal layer 101, a cooling medium is supplied to the surface of the uppermost metal layer 101 laminated in the step S21 of laminating the metal layers 101 to cool the metal layer 101. The uppermost metal layer 101 is the metal layer 101 located closest to the second side D1*b* in the first direction D1. That is, the uppermost metal layer 101 is the metal layer 101 that forms the top portion of the laminate shaped portion 105. In the step S22 of cooling the metal layer 101 of the present embodiment, the cooling medium in a liquid form is directly supplied to the surface of the uppermost metal layer 101. In the step S22 of cooling the metal layer 101, for example, cutting oil or air is supplied as the cooling medium. Accordingly, when the step S21 of laminating the metal layers 101 is repeated, the new metal layer 101 is laminated on the surface of the uppermost metal layer 101 cooled in the step S22 of cooling the metal layer 101.

In the step S22 of cooling the metal layer 101 of the present embodiment, for example, the uppermost metal layer 101 may be subjected to processing other than cooling. For example, in the step S22 of cooling the metal layer 101, impurities on the surface of the uppermost metal layer 101 laminated in the step S21 of laminating the metal layers 101 may be removed. Impurities are removed by scraping off impurities adhering to the surface and the periphery of the metal layer 101 with a cutting tool or a polishing tool attached to the NC processing machine as a processing tool. Here, the impurities are foreign substances that are generated on and around the surface of the weld bead 102 and cause welding defects. Specifically, as the impurities, there are spatter, slag, and fume. The spatter is metal particles scattered around the weld bead 102. The slag is a foreign substance formed of an intermetallic compound generated from base metal or a welding material. Specific examples of the slag include glassy slag having a low melting point. The fume is a mineral dust adhering to the periphery of the weld bead 102. Fume contains components included in the base metal and welding material, but the ratio of each component is significantly different from that of the original material.

In the step S23 of measuring the temperature, the temperature of the surface of the uppermost metal layer 101 laminated in the step S21 of laminating the metal layers 101 is measured. In the step S23 of measuring the temperature, temperature information on the surface of the metal layer 101 is acquired without touching the metal layer 101 by using a thermosensor or a non-contact thermometer. The acquired temperature information is sent to a control device (not shown) to be displayed on a monitor, or used for processing with an NC processing machine.

In the step S24 of determining the temperature, it is determined whether or not the measured temperature of the surface of the metal layer 101 is lower than a predetermined reference temperature. Here, the reference temperature is a temperature at which weld beads 102 can be newly formed on the metal layer 101 without causing a deterioration in welding quality, and is a temperature at which the cooling medium supplied to the surface of the metal layer 101 is regarded as evaporating. Therefore, the reference temperature is, for example, about 100° C. In the step S24 of determining the temperature, in a case where it is determined that the measured temperature is lower than the reference temperature, the process proceeds to the step S25 of determining the number of laminated layers. In addition, in the step S24 of determining the temperature, in a case where it is determined that the temperature measured in the step S23 of measuring the temperature exceeds the reference temperature, the step S23 of measuring the temperature is performed again after a predetermined time has elapsed.

In the step S25 of determining the number of laminated layers, it is determined whether or not the metal layers 101 are laminated a predetermined number of times. Here, the predetermined number of times is the number of metal layers 101 required to form the laminate shaped portion 105 having the predetermined height H1, and is determined based on the shape data of the shaped object 100. In the step S25 of determining the number of laminated layers, in a case where it is determined that the metal layers 101 are not laminated a predetermined number of times, the process returns to the step S21 of laminating the metal layers 101. In the step S21 of laminating the metal layers 101 after the step S25 of determining the number of laminated layers, a new metal layer 101 is formed on the metal layer 101 of which the temperature is measured. In the step S25 of determining the number of laminated layers, in a case where it is determined that the metal layers 101 are laminated a predetermined number of times, the process proceeds to the step S30 of forming the processed side surface 103.

Figure 4:
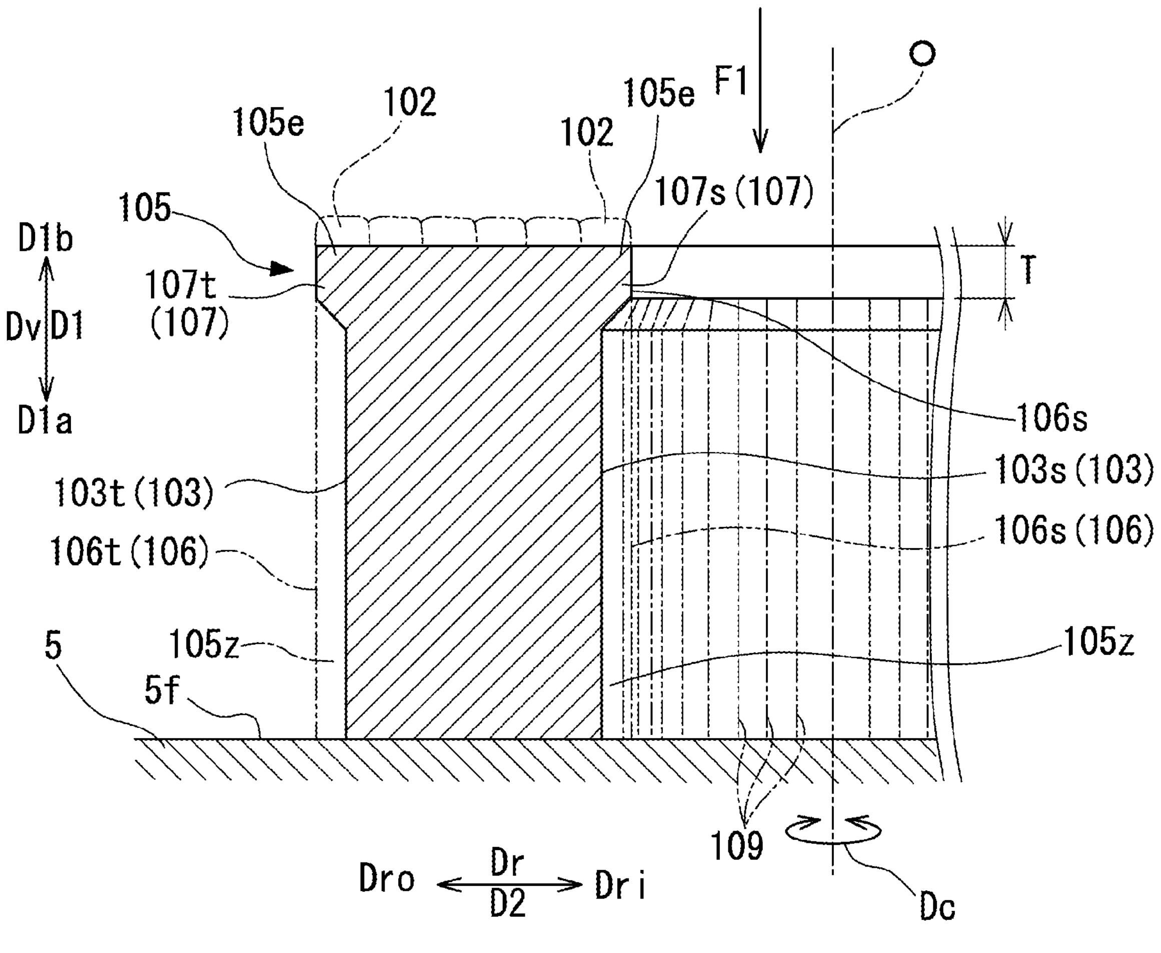
FIG. 4 is a semi-cross-sectional view parallel to the axis showing a state in which a receiving portion and a processed side surface are formed in the laminate shaped portion in a step of forming a processed side surface of the laminate shaping method.

In the step S30 of forming the processed side surface 103, the shaped portion side surface 106 is cut with respect to the laminate shaped portion 105 formed with the predetermined height H1. As shown in FIG. 4, in the step S30 of forming the processed side surface 103, at least a part of the shaped portion side surface 106 is cut in the laminate shaped portion 105 to form the processed side surface 103.

The processed side surface 103 is formed by cutting the shaped portion side surface 106 by a predetermined dimension so as to be recessed in the radial direction Dr. The processed side surface 103 is formed as a smooth surface having a surface roughness smaller than that of the shaped portion side surface 106. The processed side surface 103 is formed by removing an excess thickness portion 105*z* of the laminate shaped portion 105. The excess thickness portion 105*z* is a portion formed in a region larger than the shape of the shaped object 100 in the laminate shaped portion 105, and is a portion including sagging generated during welding. In addition, the processed side surface 103 of the present embodiment constitutes a side surface as a product. That is, the processed side surface 103 is a part of the inner circumferential surface and the outer circumferential surface of the shaped object 100 in the cross section parallel to the axis O.

In the present embodiment, in the laminate shaped portion 105, an inner processed side surface 103*s* is formed on the inner shaped portion side surface 106*s* facing the inside Dri in the radial direction Dr. In addition, in the present embodiment, an outer processed side surface 103*t* is further formed on the outer shaped portion side surface 106*t* facing the outside Dro in the radial direction Dr.

In the step S30 of forming the processed side surface 103, the processed side surface 103 is formed so that a receiving portion 107 projecting in the second direction D2 with respect to the processed side surface 103 is left at an end portion 105*e* on the second side D1*b* of the uppermost layer of the laminate shaped portion 105 in the first direction D1. The end portion 105*e* is a corner portion of the uppermost layer of the laminate shaped portion 105. In the present embodiment, the receiving portion 107 includes an inner receiving portion 107*s* projecting from the inner processed side surface 103*s* toward the inside Dri in the radial direction Dr, and an outer receiving portion 107*t* projecting from the outer processed side surface 103*t* toward the outside Dro in the radial direction Dr.

A thickness T of the receiving portion 107 in the first direction D1 is preferably equal to or larger than the penetration dimension of the weld beads 102 with respect to the receiving portion 107. The thickness T of the receiving portion 107 is preferably, for example, twice or more and five times or less with respect to the penetration dimension of the weld beads 102. The penetration dimension is the length in the first direction D1 of the portion that melts when the weld bead is formed. The receiving portion 107 of the present embodiment is formed to leave the shaped portion side surface 106 at least partially in the first direction D1. The receiving portion 107 may be formed without leaving the shaped portion side surface 106.

The inner receiving portion 107*s* is formed so that the thickness T gradually decreases from the outside Dro toward the inside Dri in the radial direction Dr. The outer receiving portion 107*t* is formed so that the thickness T gradually decreases from the inside Dri toward the outside Dro in the radial direction Dr. The thickness T of the inner receiving portion 107*s* and the outer receiving portion 107*t* in the radial direction Dr may be constant. It is preferable that the cross-sectional shapes of the inner receiving portion 107*s* and the outer receiving portion 107*t* parallel to the axis O may be shapes close to line symmetry.

In the step S30 of forming the processed side surface 103, it is preferable that the shaped portion side surface 106 is cut while the tool is moved in the first direction D1 by the NC processing machine when the processed side surface 103 is formed. That is, the processed side surface 103 is formed by cutting the shaped portion side surface 106 in the flow direction F1. Accordingly, a plurality of processing marks 109 extending in the first direction D1 are formed on the processed side surface 103 in a circumferential direction Dc centered on the axis O. Accordingly, the processing marks 109 are in a state of extending along the flow direction F1 of the fluid flowing through the inside of the shaped object 100 after completion.

Here, after the step S30 of forming the processed side surface 103 is completed, the shape (dimensions) of the formed processed side surface 103 may be measured. The shape of the processed side surface 103 is measured by contact or in a non-contact manner using, for example, a three-dimensional measuring device. Specifically, in a case of measuring the shape of the processed side surface 103 in a non-contact manner, for example, a laser beam, a pattern light, or an arc sensor is used. In a case of measuring the shape of the processed side surface 103 by contact, for example, a touch sensor is used. After measuring the shape of the processed side surface 103, it is determined whether or not the measured shape of the processed side surface 103 deviates from a predetermined reference. Here, the predetermined reference is determined according to the dimensions that can be tolerated for the shape of the final shaped object 100. Examples of the reference include a value considering a certain dimensional tolerance in the shape data of the shaped object 100. In a case where it is determined that the shape of the processed side surface 103 deviates from the reference, additional processing may be performed until the shape does not deviate from the reference.

In this manner, in the step S30 of forming the processed side surface 103, the inner processed side surface 103*s* and the outer processed side surface 103*t* are formed, so that one unit step S60 is completed. As shown in FIG. 2, the unit step S60 is a step including the step S20 of forming the laminate shaped portion 105 and the step S30 of forming the processed side surface 103. In the laminate shaping method S10, the unit step S60 is repeatedly performed. When one unit step S60 is completed, the process proceeds to step S40 of determining the number of times the laminate shaped portion 105 is formed.

In the step S40 of determining the number of times the laminate shaped portion 105 is formed, it is determined whether or not the laminate shaped portion 105 is formed a predetermined number of times. Here, the predetermined number of times is the number of laminate shaped portions 105 required to form the shaped object 100, and is determined based on the shape data of the shaped object 100. In the step S40 of determining the number of times the laminate shaped portion 105 is formed, in a case where it is determined that the laminate shaped portion 105 is not formed the predetermined number of times, the unit step S60 is repeated. In the step S40 of determining the number of times the laminate shaped portion 105 is formed, in a case where it is determined that the laminate shaped portion 105 is formed the predetermined number of times, the process proceeds to step S50 of performing final processing.

Figure 5:
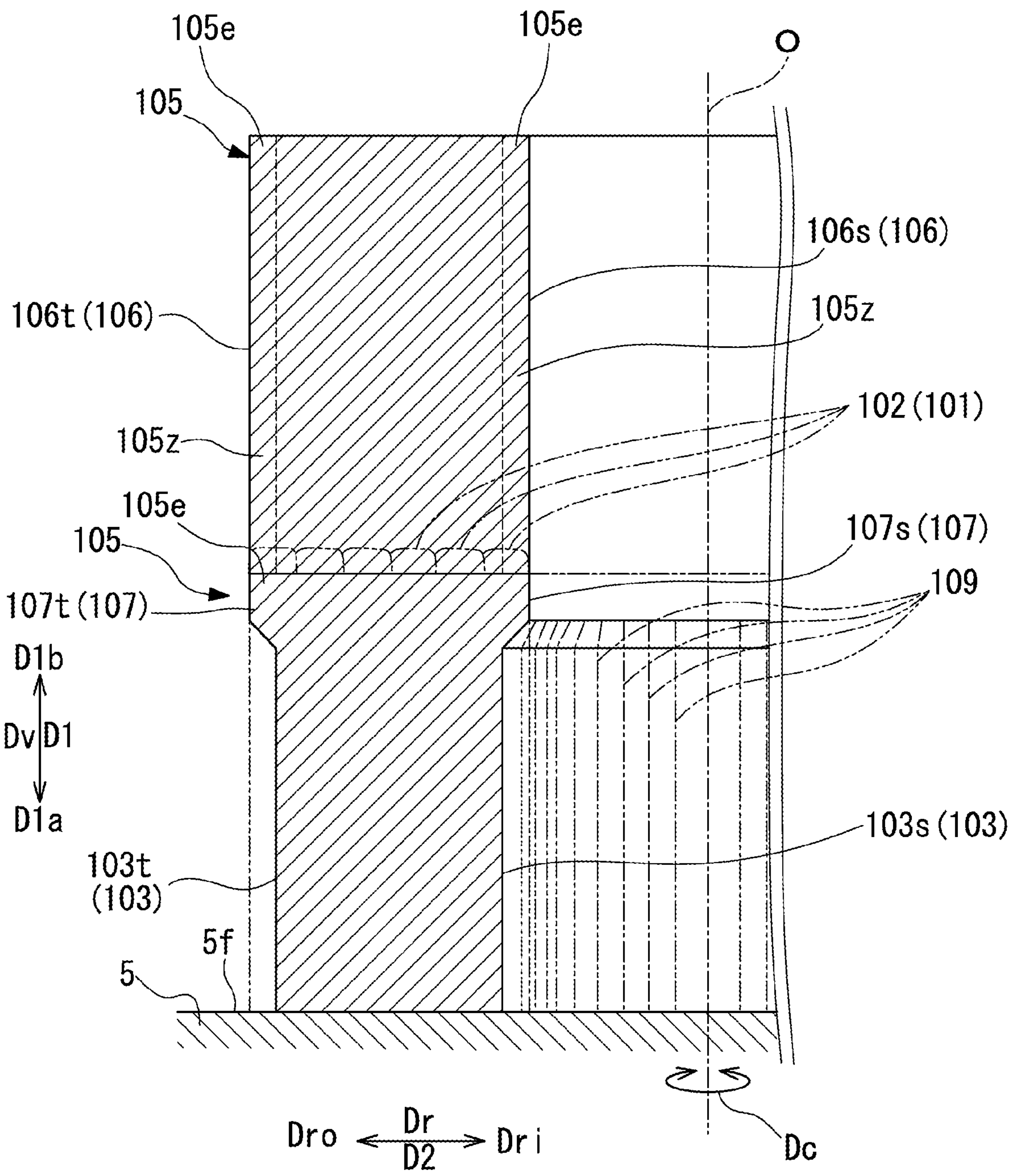
FIG. 5 is a semi-cross-sectional view parallel to the axis showing a state in which a new laminate shaped portion is formed by laminating a metal layer on the receiving portion in a step of forming a laminate shaped portion in second and subsequent unit steps in the laminate shaping method.

In a case where the unit step S60 is repeated, the process returns to the step S21 of laminating the metal layers 101. As shown in FIG. 5, when the unit step S60 is repeated (when the second and subsequent unit steps S60 are performed), in the step S20 of forming the laminate shaped portion 105, a new metal layer 101 is laminated so as to overlap the upper surface (the surface of the uppermost layer) of the receiving portion 107 in the first direction D1. Specifically, the metal layer 101 newly formed when the laminate shaped portion 105 is additionally formed is formed so as to overlap the receiving portion 107 with respect to the surface of the uppermost metal layer 101 of the laminate shaped portion 105 that has already been formed. The receiving portion 107 projects in the second direction D2 with respect to the processed side surface 103. Therefore, by sequentially laminating the metal layers 101 of the newly additionally formed laminate shaped portion 105, the excess thickness portion 105*z* of the additionally formed laminate shaped portion 105 is formed on the receiving portion 107. When the new metal layer 101 is laminated on the upper surface of the receiving portion 107, the heat energy due to the penetration of the weld beads 102 in a portion forming the excess thickness portion 105*z* and the heat of the weld beads 102 themselves is absorbed by the receiving portion 107.

Figure 6:
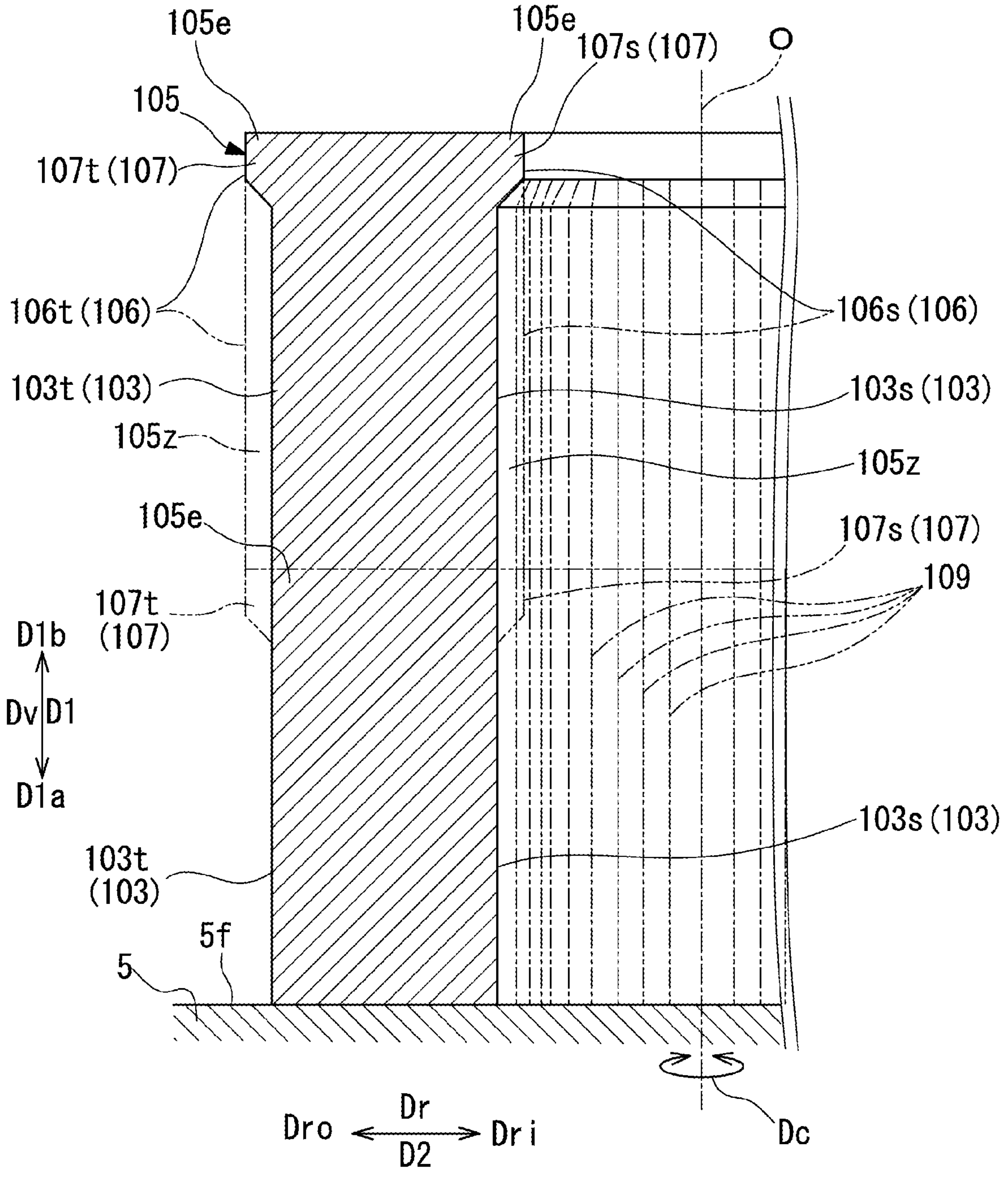
FIG. 6 is a semi-cross-sectional view parallel to the axis showing a state in which a receiving portion and a processed side surface are formed in the new laminate shaped portion in the step of forming a laminate shaped portion in the second and subsequent unit steps in the laminate shaping method.

In addition, in the step S30 of forming the processed side surface 103 in the second and subsequent unit steps S60, the shaped portion side surface 106 is cut with respect to the newly formed laminate shaped portion 105. In this case, as shown in FIG. 6, the processed side surface 103 is formed on the end portion 105*e* of the newly formed laminate shaped portion 105 so that the receiving portion 107 projecting in the second direction D2 is newly left. Furthermore, the receiving portion 107 of the laminate shaped portion 105 that has already been formed is cut. Accordingly, the processed side surface 103 (the inner processed side surface 103*s* and the outer processed side surface 103*t*) of the laminate shaped portion 105 that has already been formed and the processed side surface 103 (the inner processed side surface 103*s* and the outer processed side surface 103*t*) of the newly formed laminate shaped portion 105 are formed as a smooth surface that is continuous in the first direction D1.

Figure 7:
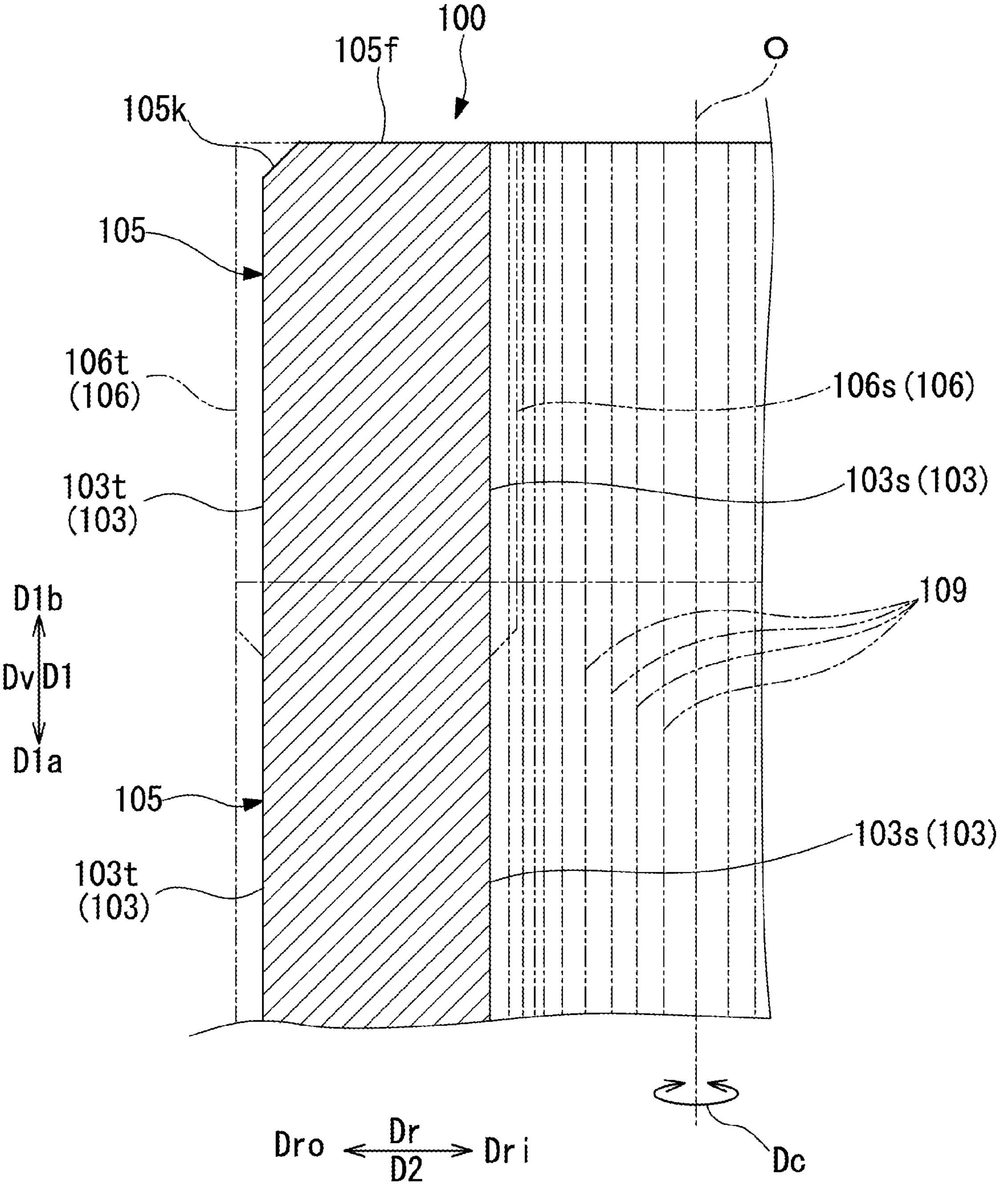
FIG. 7 is a semi-cross-sectional view parallel to the axis showing a state in which a shaped product is formed in a step of performing final processing of the laminate shaping method.

In the step S50 of performing the final processing performed after the laminate shaped portion 105 is laminated the predetermined number of times, as shown in FIG. 7, the shaped portion side surface 106 (the inner shaped portion side surface 106*s* and the outer shaped portion side surface 106*t*) of the laminate shaped portion 105 that is formed finally and is located closest to the second side D1*b* in the first direction D1 is cut to form the processed side surface 103 (the inner processed side surface 103*s* and the outer processed side surface 103*t*). In this case, it is not necessary to form the receiving portion 107 in the finally formed laminate shaped portion 105. Accordingly, the processed side surface 103 of the laminate shaped portion 105 that has already been formed and the processed side surface 103 of the laminate shaped portion 105 that is finally formed form a continuous smooth surface in the first direction D1.

In the step S50 of performing the final processing, the surface (the upper surface of the shaped object 100) of the laminate shaped portion 105 located closest to the second side D1*b* in the first direction D1 may be cut to form a flat surface 105*f* orthogonal to the first direction D1. In addition, in the step S50 of performing the final processing, the corner portion of the shaped object 100 may be subjected to processing such as forming a beveled portion 105*k* for welding the shaped object 100 to another component. Furthermore, in the step S50 of performing the final processing, finishing may be performed on the outer processed side surface 103*t* with a predetermined processing accuracy so as to further reduce the surface roughness of the outer processed side surface 103*t* facing the outside Dro in the radial direction Dr of the plurality of laminate shaped portions 105 that are laminated. When the step S50 of performing the final processing is completed, the shaping of the shaped object 100 having the predetermined dimensions is completed.

(Actions and Effects)

In the laminate shaping method S10 having the above configuration, in the step S30 of forming the processed side surface 103, the processed side surface 103 is formed so that the receiving portion 107 is left at the uppermost layer of the laminate shaped portion 105. The receiving portion 107 projects in the second direction D2 with respect to the processed side surface 103. When the unit step S60 is repeated, the new metal layer 101 is laminated on the receiving portion 107, so that the heat energy due to the penetration of the weld beads 102 and the thermal effect of the weld beads 102 can be absorbed by the receiving portion 107 during the lamination of the weld beads 102. Accordingly, the receiving portion 107 can suppress collapse of the shape of the processed side surface 103 due to adhesion of sagging of molten metal to the processed side surface 103. As a result, it is possible to suppress the influence of sagging of the metal during the lamination of the metal and form a three-dimensional shaped object 100 with good quality.

The metal layers 101 are laminated in the first direction D1 to form the laminate shaped portion 105. The processed side surface 103 is formed by cutting the shaped portion side surface 106 for each of the formed laminate shaped portions 105. The laminate shaped portions 105 are sequentially laminated in the first direction D1 by repeatedly performing the unit step S60. Here, in a state where a plurality of the laminate shaped portions 105 are laminated in the first direction D1 and are close to the shape of the final shaped object 100, it may be difficult for the tool for processing to access the shaped portion side surface 106. However, in the present embodiment, the processed side surface 103 is formed for each of the formed laminate shaped portions 105. That is, since the shaped portion side surface 106 of the laminate shaped portion 105 is cut for each unit step S60, it does not become difficult for the tool to access the shaped portion side surface 106. As a result, all the side surfaces of the shaped object 100, which is the final finished product, can be formed into the processed side surface 103 having the intended shape.

By causing the thickness T of the receiving portion 107 in the first direction D1 to be equal to or larger than the penetration dimension of the weld beads 102 with respect to the receiving portion 107, the heat energy due to the penetration of the weld beads 102 and the heat of the weld beads 102 themselves can be sufficiently absorbed by the receiving portion 107. As a result, it is possible to stably suppress the adhesion of the metal sagging during the formation of the metal layer 101 to the processed side surface 103. Therefore, the processed side surface 103 that has already been formed can be maintained in the intended shape, and the three-dimensional shaped object 100 can be formed with better quality.

In addition, by forming the receiving portion 107 with the shaped portion side surface 106 left, it is possible to secure a certain thickness in the receiving portion 107 from the root to the tip end portion of the receiving portion 107 in the second direction D2. As a result, the weld beads 102 forming the new metal layer 101 can be stably received by the receiving portion 107. Accordingly, it is possible to more effectively suppress the occurrence of metal sagging during the lamination of the metal.

In the shaped object 100 having a cylindrical shape, the inner processed side surface 103*s* is formed on the inner shaped portion side surface 106*s* of the laminate shaped portion 105 for each unit step S60. Accordingly, even in the shaped object 100 having a cylindrical shape, it is possible to satisfactorily process the inner circumferential surface of the shaped object 100 while suppressing an obstacle to access of tools or the like. Similarly, the outer processed side surface 103*t* is formed on the outer shaped portion side surface 106*t* facing the outside Dro in the radial direction Dr of the shaped object 100. Accordingly, it is possible to satisfactorily process the outer circumferential surface of the shaped object 100 having a cylindrical shape together with the inner processed side surface 103*s*.

The surface of the uppermost metal layer 101 is cooled. By the cooling, the temperature of the uppermost metal layer 101 is lowered. In a case where the metal layers 101 are laminated, there is a possibility that lamination of the new metal layer 101 on the metal layer 101 in a state where the temperature is too high may cause deterioration of the welding quality. However, by cooling the uppermost metal layer 101, it is possible to prevent the new metal layer 101 from being laminated on the metal layer 101 in a high temperature state. Furthermore, compared to a case where the metal layer 101 is simply left to cool, the welding waiting time until the start of the formation of a new metal layer 101 can be shortened.

By measuring the temperature of the uppermost metal layer 101 in the step S23 of measuring the temperature, it is possible to prevent the new metal layer 101 from being laminated on the metal layer 101 having a high temperature with high accuracy. Therefore, deterioration of the welding quality of the new metal layer 101 can be stably suppressed. Accordingly, it is possible to further suppress a decrease in the strength of the finally manufactured shaped object 100.

In the step S30 of forming the processed side surface 103, the shaped portion side surface 106 is cut along the flow direction of the fluid flowing through the shaped object 100. Accordingly, the processing marks 109 formed on the processed side surface 103 are formed along the flow direction F1 of the fluid flowing through the shaped object 100. By causing the processing marks 109 to follow the flow of the fluid, when the fluid flows, the processing marks 109 make it difficult for turbulence such as a vortex to occur. Accordingly, the influence of the processing marks 109 on the flow of the fluid can be suppressed. Therefore, even if the surface state of the processing marks 109 is slightly rough, it is difficult for a loss to occur in the flow of the fluid. Accordingly, it is possible to perform the processing for forming the processed side surface 103 more easily and in a short period of time.

While the embodiment of the present disclosure has been described in detail with reference to the drawings, the specific configuration is not limited to this embodiment, and includes design changes and the like without departing from the gist of the present disclosure.

In the above embodiment, in the laminate shaping method S10, the receiving portions 107 are formed on the shaped portion side surfaces 106 at both end portions in the second direction D2, but are not limited to this configuration. The receiving portion 107 may be formed only on the shaped portion side surface 106 on either one side of the second directions D2. In addition, in a case where the receiving portions 107 are formed on the shaped portion side surfaces 106 on both sides in the second direction D2, the receiving portions 107 are not limited to the structure in which the receiving portions 107 are formed in the same shape as in the present embodiment, but the shape and size of the receiving portions 107 may be changed depending on the formation position.

In the above embodiment, as the shaped object 100, a cylindrical shape is formed, but the shaped object 100 is not limited thereto. The shape and configuration of the shaped object 100 may employ, for example, another configuration as appropriate, such as a wall shape.

In the above embodiment, the outer processed side surface 103*t* is formed on the laminate shaped portion 105 having the predetermined height H1 for each unit step S60, but the outer processed side surface 103*t* is not limited thereto. Even if the shaped object 100 has a cylindrical shape, there is no problem in processing of the outer processed side surface 103*t* because the processing is performed from the outside Dro in the radial direction Dr. In such a case, the outer processed side surface 103*t* may not be formed whenever the laminate shaped portion 105 having the predetermined height H1 is formed (for each unit step S60), but the outer processed side surfaces 103*t* may be collectively formed in the step S50 of performing the final processing. Furthermore, even in a case where both the inner processed side surface 103*s* and the outer processed side surface 103*t* are formed in the step S30 of forming the processed side surface 103, the number of times the outer processed side surface 103*t* is formed may be smaller than the number of times the inner processed side surface 103*s* is formed.

The order of the laminate shaping method S10 is not limited to the above description, and changes such as changing the order, omitting some steps, and adding other steps may be performed. For example, it is not necessary to perform the step S22 of cooling the metal layer 101, the step S23 of measuring the temperature, and the step S24 of determining the temperature. The step S20 of forming the laminate shaped portion 105 is not limited to forming a plurality of the metal layers 101. That is, in the step S21 of laminating the metal layers 101, only one metal layer 101 may be formed, and the step S30 of forming the processed side surface 103 may be performed.

<Additional Notes>

(1) A laminate shaping method S10 according to a first aspect is the laminate shaping method S10 of shaping the three-dimensional shaped object 100 formed by sequentially laminating a plurality of the metal layers 101, the method including: the unit step S60 repeatedly performed, the unit step S60 including the step S20 of forming the laminate shaped portion 105 by laminating the metal layers 101 formed of the weld beads 102, and the step S30 of forming the processed side surface 103 by cutting the shaped portion side surface 106 of the laminate shaped portion 105 that faces the second direction D2 intersecting the first direction D1 in which the metal layers 101 are laminated in the laminate shaped portion 105, in which, in the step S30 of forming the processed side surface 103, the shaped portion side surface 106 is cut so that the receiving portion 107 projecting in the second direction D2 with respect to the processed side surface 103, the receiving portion 107 is formed at the uppermost layer of the laminate shaped portion 105 in the first direction D1, and when the unit step S60 is repeated, in the step S20 of forming the laminate shaped portion 105, a new metal layer 101 is laminated so as to overlap the upper surface of the receiving portion 107 in the first direction D1.

Examples of the shaped object 100 include a component forming a rotating machine such as a turbine or a compressor. Specific examples include a nozzle, an impeller, and a casing.

In this laminate shaping method S10, when the unit step S60 is repeated, the new metal layer 101 is laminated on the receiving portion 107, so that the heat energy due to the penetration of the weld beads 102 and the thermal effect of the weld beads 102 can be absorbed by the receiving portion 107 during the lamination of the weld beads 102. Accordingly, the receiving portion 107 can suppress collapse of the shape of the processed side surface 103 due to adhesion of sagging of molten metal to the processed side surface 103. As a result, it is possible to suppress the influence of sagging of the metal during the lamination of the metal and form a three-dimensional shaped object 100 with good quality.

(2) A laminate shaping method S10 according to a second aspect is the laminate shaping method S10 of (1), in which the thickness T of the receiving portion 107 in the first direction D1 is equal to or larger than the penetration dimension of the weld beads 102 into the receiving portion 107.

Accordingly, the heat energy due to the penetration of the weld beads 102 and the heat of the weld beads 102 themselves can be sufficiently absorbed by the receiving portion 107. As a result, it is possible to stably suppress the adhesion of the metal sagging during the formation of the metal layer 101 to the processed side surface 103. Therefore, the processed side surface 103 that has already been formed can be maintained in the intended shape, and the three-dimensional shaped object 100 can be formed with better quality.

(3) A laminate shaping method S10 according to a third aspect is the laminate shaping method S10 of (1) or (2), in which the receiving portion 107 is formed to leave the shaped portion side surface 106 at least partially in the first direction D1.

Accordingly, it is possible to secure a certain thickness in the receiving portion 107. As a result, the weld beads 102 forming the new metal layer 101 can be stably received by the receiving portion 107. Accordingly, it is possible to more effectively suppress the occurrence of metal sagging during the lamination of the metal.

(4) A laminate shaping method S10 according to a fourth aspect is the laminate shaping method S10 according to any one of (1) to (3), in which, in the step S20 of forming the laminate shaped portion 105, after cooling the metal layer 101 by supplying a cooling medium to the surface of the metal layer 101 forming the uppermost layer in the first direction D1, the new metal layer 101 is laminated on the surface of the metal layer 101 after cooling.

Accordingly, the surface of the uppermost metal layer 101 is cooled by the cooling medium and the temperature is lowered. Therefore, it is possible to prevent the new metal layer 101 from being laminated on the metal layer 101 in a high temperature state. Furthermore, compared to a case where the metal layer 101 is simply left to cool, the welding waiting time until the start of the formation of a new metal layer 101 can be shortened.

(5) A laminate shaping method S10 according to a fifth aspect is the laminate shaping method S10 according to any one of (1) to (4), in which the shaped object 100 is formed in a cylindrical shape centered on the axis O extending in the first direction D1 so as to allow the fluid to flow through an inside of the shaped object 100, in the step of forming the processed side surface 103, a side surface of the shaped object 100 facing toward the inside Dri in the radial direction Dr is formed by the processed side surface 103, and the processed side surface 103 is formed by cutting the shaped portion side surface 106 in the flow direction of the fluid flowing through the inside of the shaped object 100.

Accordingly, the shaped portion side surface 106 is cut along the flow direction of the fluid flowing through the shaped object 100. As a result, the processing marks 109 formed on the processed side surface 103 are formed along the flow direction F1 of the fluid flowing through the shaped object 100. By causing the processing marks 109 to follow the flow of the fluid, when the fluid flows, the processing marks 109 make it difficult for turbulence such as a vortex to occur. Accordingly, the influence of the processing marks 109 on the flow of the fluid can be suppressed. Therefore, even if the surface state of the processing marks 109 is slightly rough, it is difficult for a loss to occur in the flow of the fluid. Accordingly, it is possible to perform the processing for forming the processed side surface 103 more easily and in a short period of time.

EXPLANATION OF REFERENCES

5 Table
**5*f*** Support surface
100 Shaped object
101 Metal layer
102 Weld bead
103 Processed side surface
**103*s*** Inner processed side surface
**103*t*** Outer processed side surface
105 Laminate shaped portion
**105*e*** End portion
**105*f*** Flat surface
**105*k*** Beveled portion

105*z* Excess thickness portion
106 Shaped portion side surface
106*s* Inner shaped portion side surface
106*t* Outer shaped portion side surface
107 Receiving portion
107*s* Inner receiving portion
107*t* Outer receiving portion
109 Processing mark
D1 First direction
D1*a* First side
D1*b* Second side
D2 Second direction
Dc Circumferential direction
Dr Radial direction
Dri Inside
Dro Outside
Dv Vertical direction
F1 Flow direction of a fluid
H1 Height of a laminate shaped portion
O Axis
S10 Laminate shaping method
S20 Step of forming a laminate shaped portion
S21 Step of laminating metal layers
S22 Step of cooling the metal layer
S23 Step of measuring a temperature
S24 Step of determining the temperature
S25 Step of determining the number of laminated layers
S30 Step of forming a processed side surface
S40 Step of determining the number of times the laminate shaped portion is formed
S50 Step of performing final processing
S60 Unit step
T Thickness

What is claimed is:

1. A laminate shaping method of shaping a three-dimensional object formed by sequentially laminating metal layers, the method comprising:

repeatedly performing a unit step to form the object in a cylindrical shape centered on an axis extending in a first direction in which the metal layers are laminated, the unit step comprising:

a step of forming a laminate shaped portion by laminating metal layers formed of weld beads; and a step of forming a processed side surface by cutting, in the first direction, a shaped portion side surface of the laminate shaped portion that faces a second direction intersecting the first direction such that processing marks, extending in the first direction and disposed in a circumferential direction around the axis, are formed on the processed side surface, wherein the step of forming the processed side surface comprises:

cutting the shaped portion side surface so that a receiving portion, projecting in the second direction with respect to the processed side surface, is formed at an uppermost layer of the laminate shaped portion in the first direction; and forming a side surface of the object facing toward an inside in a radial direction, and the step of forming the laminate shaped portion comprises laminating a new metal layer so as to overlap an upper surface of the receiving portion in the first direction.

2. The laminate shaping method according to claim 1, wherein a thickness of the receiving portion in the first direction is equal to or larger than a penetration dimension of the weld beads into the receiving portion.

3. The laminate shaping method according to claim 1, wherein the receiving portion is formed to leave the shaped portion side surface at least partially in the first direction.

4. The laminate shaping method according to claim 1, wherein the step of forming the laminate shaped portion comprises:

cooling one of the metal layers forming the uppermost layer in the first direction by supplying a cooling medium to a surface of that metal layer; and laminating the new metal layer on the surface of the cooled metal layer.

5. A laminate shaping method of shaping a three-dimensional object formed by sequentially laminating metal layers, the method comprising:

repeatedly performing a unit step to form the object in a cylindrical shape centered on an axis extending in a first direction, the unit step comprising:

forming a laminate shaped portion by laminating metal layers in the first direction with weld beads; and cutting a shaped portion side surface of the laminate shaped portion that faces a second direction intersecting the first direction by moving a cutting tool in the first direction such that:

processing marks, extending in the first direction and disposed in a circumferential direction around the axis, are formed on a processed side surface, and a receiving portion, projecting in the second direction with respect to the processed side surface, is formed at an uppermost layer of the laminate shaped portion in the first direction, wherein the processed side surface faces inside in a radial direction of the object, and the forming the laminate shaped portion comprises laminating a new metal layer so as to overlap an upper surface of the receiving portion in the first direction.

* * * * *